U nited States Patent Office 3,318,891
Patented May 9, 1967

3,318,891
PALLADIUM DIACETATE AND METHOD FOR
ITS PREPARATION
Eugene A. Hausman, Cranford, N.J., James R. Grasso, Brooklyn, N.Y., and George Pond, Newark, N.J., assignors to Engelhard Industries, Inc., Newark, N.J., a corporation of Delaware
No Drawing. Filed Aug. 30, 1963, Ser. No. 305,841
12 Claims. (Cl. 260—270)

This invention relates to palladium diacetate and to a process for its preparation. In particular, the invention is concerned with a novel crystalline palladium (II) acetate having utility as a catalyst in various chemical reactions, and to methods for the preparation of palladium diacetate in the crystalline form of high purity.

Palladium, its oxide and its salts, including organic and inorganic salts, have been widely employed as catalysts variously for hydrogenation reactions and, more recently, in oxidation reactions such as for the preparation of aldehydes, ketones and the like by the catalytic liquid phase oxidation of hydrocarbons. Additionally, palladium in a form which would be soluble in hydrocarbon solvents, e.g. hexane, benzene, toluene, etc. is of interest as a catalyst for homogeneous solution polymerization of unsaturated aliphatic hydrocarbons such as ethylene, propylene and the like. Additionally, there presently exists a need for palladium catalysts in certain of the above applications which is of high purity and essentially free of certain negative ions, particularly chloride, which inhibits certain palladium-catalyst reactions.

It has now been found that palladium diacetate can be prepared in crystalline form free of undesired contaminants such as palladium hydroxy acetate by reaction of specially prepared hydrous palladium oxide (referred to hereinafter as HPO). Although prior workers have, in the course of preparing palladium catalysts, treated hydrous palladium oxide with acetic acid, to the best of our knowledge, crystalline palladium diacetate has never been prepared heretofore, and is a new composition of matter. Further, pure crystalline palladium diacetate is not inherently produced by simple reaction of hydrous palladium oxide with acetic acid since, unless certain procedures and techniques hereinafter disclosed are utilized for the preparation of the HPO, it is not possible to obtain pure crystalline Pd(OAc)$_2$ by treatment of HPO with acetic acid.

We have further found that crystalline palladium diacetate is soluble in benzene, and that from benzene solutions thereof, a crystalline complex corresponding to the formula [Pd(C$_2$H$_3$O$_2$)$_2$]$_2$(C$_6$H$_6$) and having utility as a catalyst can be recovered. This novel complex and its method of preparation constitute one aspect of the present invention.

It has been further found that crystalline palladium diacetate readily reacts with a wide variety of organic amines to give solid products which in many instances are crystalline. It has not been determined whether these reaction products are complexes or addition products as distinguished from true chemical compounds. The products obtained by reacting palladium diacetate with pyridine, aniline and benzylamine were found to be well defined crystalline products having the empirical formula

[Pd(OAc$_2$)](C$_5$H$_5$N—)$_2$, [Pd(OAc$_2$)](C$_6$H$_5$NH—)$_2$ and
[Pd(OAc$_2$)](C$_6$H$_5$CH$_2$NH—)$_4$ respectively. Compounds of palladium acetate and quinoline, 2-amino-pyrimidine and benzidine have also been prepared in the form of non-crystalline precipitates. The reaction products of palladium diacetate and amines are generally soluble in aromatic hydrocarbon solvents, and can be employed as catalysts for homogeneous polymerization of ethylenic monomers, as catalysts for liquid phase oxidation reactions and the like.

In accordance with the process of the present invention, a suitable HPO for conversion to crystalline palladium diacetate is first prepared by treatment of an aqueous solution of a soluble palladium salt with an alkaline reagent to precipitate HPO. While HPO can be prepared by such treatment of a soluble palladium salt at any temperature and under a wide variety of conditions, we have found that suitable HPO (for subsequent conversion to palladium diacetate) is prepared by effecting the treatment with the alkaline reagent at low temperature, below 85° C., and preferably below 60° C., and by carrying out the treatment rapidly. If the hydrated palladium oxide is aged, as by slow precipitation, or precipitated hot, it will in part be converted to a polymeric hydrous palladium oxide which, on further treatment with acetic acid, yields polymeric palladium hydroxy acetate, Pd(OH)(OAc). By precipitating the HPO quickly, and using a solution temperature of less than about 85° C., a fluffy precipitate having a selective crystallite size of less than about 20 A. is produced. Such a precipitate dissolves readily in excess acetic acid, and pure crystalline palladium diacetate can be recovered from the resultant solution in high purity and yield. Generally, the quality of HPO is not affected by precipitation at lower temperatures, and ambient temperatures or lower, e.g. 10° C. can be employed.

In preparing suitable HPO, readily available palladium (II) salts which are soluble can be employed, e.g. palladium nitrite, palladium dichloride, disodium palladium tetrachloride (Na$_2$PdCl$_4$), the corresponding potassium salt, and the like. Of these, the chlorides are preferred by reason of their availability and lower cost. The sodium salt is especially preferred since it is cheaper and the HPO can be precipitated with less heat of reaction (there being no acid base neutralization), and the precipitation temperature thus readily controlled and maintained below about 85° C.

If PdCl$_2$ is employed as the source of HPO, it is first necessary to dissolve the salt in aqueous acid, e.g. employing 2 mols HCl per mol of PdCl$_2$, and neutralization of the resultant acid solution must be carried out carefully to avoid excessive temperature rise due to the exothermic nature of the acid-base reaction. On the other hand, the most useful HPO is prepared by rapid precipitation of HPO, e.g. in less than about one hour and, preferably less than about ¼ hour. While on a laboratory scale it is possible to rapidly remove heat of neutralization and thus effect rapid precipitation under desired conditions of temperature, it is apparent that large-scale commercial practice would require elaborate equipment for heat removal at a rapid rate to maintain the reaction mixture below the maximum allowable temperature. Accordingly, in commercial conduct of the process the neutral sodium salt Na$_2$PdCl$_4$ is much to be preferred.

Conventional bases can be employed as alkaline reagent for treatment of the palladium salt solution, e.g. sodium hydroxide, potassium hydroxide, sodium carbonate, sodium bicarbonate, potassium carbonate, and the like, added as solids, or preferably as aqueous solution to the palladium salt solution. The concentration of alkaline reagent, if in aqueous solution, is not critical. Generally, HPO precipitation is complete when the palladium salt solution reaches a pH of 8-10. Excess alkaline reagent may be employed without harmful effect.

The HPO cake which is precipitated rapidly and below the critical temperature set forth above is filtered, worked free of salts and partially dried. HPO readily loses water, and if the filtered cake is completely dried, as by heating for prolonged periods of time, the HPO will partially polymerize and will not dissolve in glacial acetic acid, or if dissolved, will not yield high purity crystalline palladium diacetate. It has been found that a filter cake containing about 75% Pd is practically insoluble in acetic acid. As shown in the table:

| Compound | Wt. percent | |
|---|---|---|
| | Pd | $H_2O$ |
| PdO | 87.0 | 0 |
| $PdO \cdot H_2O$ | 75.8 | 12.8 |
| $PdO \cdot 2H_2O$ | 67 | 22.7 | this corresponds approximately to $PdO \cdot H_2O$. In order to avoid formation of polymeric HPO which will not yield crystalline palladium diacetate of high purity, it is preferred to maintain a cake content of at least about 20% water. On the other hand, too much water is not desired since palladium diacetate as hydrolyzed in water, slowly at low temperatures (50° C.), but rapidly at elevated temperatures (above about 85° C.). Generally, a cake water content of 20–85%, corresponding to Pd content of 15–70% by weight is desirable and a cake water content of 50–70% preferred.

In effecting the conversion of HPO prepared as described above to crystalline palladium diacetate, the HPO is dissolved or dispersed in glacial acetic acid. If properly prepared as herein set forth, the HPO will dissolve completely in excess acetic acid, but complete dissolution does not necessarily indicate that high purity palladium diacetate will be formed.

The conversion of HPO to $Pd(OAc)_2$ can be effected by dissolving the cake in acetic acid at temperatures below about 85°, followed by evaporation under vacuum at room temperature. Alternatively, the wet HPO cake may be treated with a lesser amount of acetic acid in which the HPO is dispersed and/or partially dissolved, and the resultant suspension stirred or held for several hours at ambient temperature to convert the HPO to the desired crystalline diacetate. If a very large excess of acetic acid is employed, crystallization will not occur since the desired salt is quite soluble in acetic acid. Generally, the HPO cake containing 15–70% Pd by weight is treated with from about 1 to 20 ml., preferably about 1 to 5 ml., acetic acid per gram of cake in the manner described.

Crystalline palladium diacetate recovered from acetic acid solution is dried at a temperature below about 85° C. When heated in air, the compound decomposes to the metal and combustion products. The compound is yellow tan in color and generally crystallizes in short rods. The compound at room temperature is soluble at about 20 g./l. glacial acetic acid. Surprisingly, crystalline $Pd(OAc)_2$ is soluble in hot benzene (solubility about 40 g./l.) and, on cooling, the benzene solution yields a crystalline compound analyzing $[Pd(C_2H_3O_2)_2]_2(C_6H_6)$. This benzene compound evolves benzene on standing at room temperature.

Typical analyses of the foregoing compounds are as follows:

| $Pd(C_2H_3O_2)_2$ | Experimental | Theoretical |
|---|---|---|
| Percent Pd | 47.43 | 47.40 |
| Percent C | 19.87 | 21.40 |
| Percent H | 2.73 | 2.69 |

| $[Pd(C_2H_3O_2)_2]_2(C_6H_6)$ | Experimental | Theoretical |
|---|---|---|
| Percent Pd | 38.81 | 40.37 |
| Percent C | 32.05 | 31.90 |
| Percent H | 3.33 | 3.44 |

The following examples will provide a more complete understanding of the invention and the method for practice thereof.

EXAMPLE I

A. *Preparation of* $Pd(C_2H_3O_2)_2$ *from* $PdCl_2$ 17.4 grams of palladium (II) chloride were dissolved in 15.4 ml. of 12 normal hydrochloric acid and 33.4 ml. of water. The solution was heated to 85° C. and 77 ml. of a 20% sodium hydroxide solution was added causing complete precipitation of HPO. The precipitate was washed by decanting 4 times with 250 ml. of water, filtered, and pulled to a semi-dry cake. The cake was stirred for 2 hours with 120 ml. of glacial acetic acid at a temperature of 80° C. The solution was evaporated under vacuum at room temperature for 10 hours and yielded a crop of yellow needle-like crystals. The crystals were filtered, washed with glacial acetic acid, and dried at 85° C. for 2 hours. The yield of $Pd(C_2H_3O_2)_2$ was 19.55 gms., 72.7% of theoretical and assayed 47.30% palladium (theoretical 47.40% palladium).

EXAMPLE II

B. *Preparation of* $Pd(C_2H_3O_2)_2$ *from* $Na_2PdCl_4$ 29.40 grams of sodium tetrachloropalladate (II) were dissolved in 200 ml. of water. To the solution 45 ml. of 20% sodium hydroxide solution was added at room temperature causing complete precipitation of HPO. The precipitate was washed by decanting 4 times with 250 ml. of water, filtered, and pulled dry to a cake weighing 62.14 grams. The cake was stirred with 106 ml. of glacial acetic acid for 2 hours and allowed to stand for 8 hours.[1] The resultant crop of yellow needle-like crystals was filtered, washed with a small amount of glacial acetic acid and dried at 85° C. for 2 hours. The yield of $Pd(C_2H_3O_2)_2$ was 20.42 grams, 91.5% of theoretical and assayed 47.23% palladium (theoretical 47.4% Pd).

EXAMPLE III

C. *Preparation of* $Pd(C_2H_3O_2)_2$ *from* $Pd(NO_3)_2$ 57.2 grams of $Pd(NO_3)_2$ (containing 24 grams of Pd metal) were heated at about 105° C. for about 3.5 hours with a solution of 600 ml. of concentrated $HNO_3$ and 150 ml. of water. The solution was partially neutralized to pH 0.5 by adding 1630 ml. of 20% NaOH solution while keeping the temperature at 40°. The mixture was cooled to 25° and 180 ml. more of NaOH solution was added rapidly to bring the pH to 10. HPO precipitated as the light yellow-brown form settling well and was washed thoroughly by decantation. The filtered oxide cake assayed 42.15% Pd metal. The oxide was dissolved by heating two hours at 75–80° at a concentration of 10 grams of Pd metal per liter of acetic acid. The palladium (II) acetate was obtained as yellow-tan crystals by evaporating under vacuum at room temperature, water-washing, filtering, and air-drying. The yield of compound was 80.9% and the Pd content was 47.31%; the theoretical value is 47.40%.

EXAMPLE IV

In order to show that the temperature at which HPO is precipitated is critical, the following experiment was performed:

155 grams of $Pd(NO_3)_2$ was dissolved in 300 ml. of concentrated nitric acid. The solution was heated to boiling to expel oxides of nitrogen and diluted with 500 ml. of water. The solution was hydrolyzed at 100° C. with 465 ml. of a 20% NaOH solution and 110 grams of $Na_2CO_3$ dissolved in 500 ml. of water. The resultant HPO was a grey-black finely divided precipitate completely insoluble in acetic acid.

---

[1] During this time the HPO dissolved as the $Pd(C_2H_3O_2)_2$ crystallized out. The color of the unwashed $Pd(C_2H_3O_2)_2$ is very much like HPO so that one might think nothing had happened.

EXAMPLE V

In order to show that the HPO must be precipitated rapidly, the following comparative experiments were conducted:

A solution of $Pd(NO_3)_2$ was prepared using the method described in Example III. A portion of the solution was hydrolyzed to pH 11 by slow addition of 20% NaOH over a period of 1.5 hours. The HPO precipitate, which was dark brown, was washed and pulled dry. Assay of the cake showed 35.5% Pd. The HPO was dissolved in acetic acid at 80° C., at a concentration of 12 g. of Pd per liter of glacial acetic acid. A dark solution was obtained, and the Pd product was isolate as described in Example I. A dark viscous substance was present with the palladium (II) acetate. After washing with water, in which the dark substance was soluble, the yield of palladium (II) acetate was about 55%.

For comparison, a similar test was performed with the remaining portion of the $Pd(NO_3)_2$ solution except that the solution was neutralized with 20% NaOH to pH 0.5 and then cooled to 15° C. Additional NaOH was then added very rapidly until the solution pH was 11. A light yellow-brown precipitate of HPO was formed. The washed and filtered cake assayed 37.0% Pd. The HPO obtained by rapid hydrolysis, on addition of acetic acid, formed a light red solution and then yellow needle-like crystals of palladium (II) acetate formed. Duplicate runs were made. The yield of palladium (II) acetate was 75-85%.

The results showed that the HPO should be precipitated rapidly to give high yields of pure palladium (II) acetate.

EXAMPLE VI

In order to further show that the method of preparation and drying of HPO is critical for the successful preparation of crystalline palladium diacetate, the following experiment was performed:

HPO was prepared by hydrolysis of $Pd(NO_3)_2$ solution with NaOH at a temperature of about 90°–95° C. The HPO was washed by decantation and filtered. Half of the resultant cake was air-dried and half was dried at 60° C. in an oven overnight. The air-dried portion assayed 75.45% Pd. (Theoretical value of Pd for $PdO \cdot H_2O = 75.8\%$.) The oven-dried portion assayed 76.66% Pd. Samples of each cake were stirred for about 2 hours with glacial acetic acid in the proportion of 12 g. of Pd per liter of acetic acid. Substantially no color change was observed. Neither material was appreciably soluble in acetic acid.

EXAMPLE VII

The following test illustrates that in the step of the process involving the isolation of crystalline palladium (II) acetate by evaporation of the mother liquor, the palladium (II) acetate is decomposed by heat.

97.74 grams of $Pd(NO_3)_2$ was dissolved in 300 ml. of concentrated nitric acid. The solution was heated to boiling to expel oxides of nitrogen and diluted with 500 ml. of water. The solution was hydrolyzed with 1 liter of a 20% NaOH solution at 60° C. to a final pH of 9.0. The HPO was washed 10 times by decantation and treated with an excess of HOAc (250 ml.). The HPO dissolved readily giving a clear deep red solution. Evaporation of the solution at 60° C. gave a black tar.

EXAMPLE VIII

This example shows the preparation of a number of typical palladium acetate-amine reaction products.

A. Preparation of pyridine-palladium acetate 5 gms. of palladium acetate was added slowly with rapid stirring to 50 ml. of pyridine. After addition it was heated at 60° C. until completely dissolved. It was then cooled after which crystallization occurred. The crystals were filtered and washed with cyclohexane in a Büchner funnel and then dried in air. Yield: 4.0 gms. (57.6%). Labeled Sample No. [I–1–26].

B. Preparation of aniline-palladium acetate 5 gms. of palladium acetate was added slowly with rapid stirring to 50 ml. of aniline. After one hour the resinous mass was washed with a mixture of one part cyclohexane and two parts petroleum ether, stirred vigorously, and filtered in a Büchner funnel. It was then reslurried with a minimum amount of cyclohexane, allowed to stand for one hour and refiltered. The crystals were then washed with petroleum ether, allowed to stand for another hour, filtered and dried in air for several days. Yield: 7.8 gms. (85.6%). Labeled Sample No. [I–1–22].

C. Preparation of benzylamine-palladium acetate 5 gms. of palladium acetate was added slowly with rapid stirring to a cooled solution of 50 ml. of benzylamine containing 30 ml. of cyclohexane. After the addition the solution was heated at 60° C. until the palladium acetate was completely dissolved, cooled, and after three hours crystallization occurred. After 24 hours the slurry was filtered in a Büchner funnel, and the crystals thus separated were dissolved in hot benzene and filtered hot through a fluted filter paper containing Darco-carbon to remove a brown coloration. The crystals were filtered and washed with petroleum ether, and dried in air. Yield: 6.7 gms. (46.5%). Labeled Sample No. [I–2–23].

Elemental analysis of the reaction products prepared in this Example VIII is shown in Table I.

TABLE I

| Sample No. | Percent C | | Percent H | | Percent N | | Percent Pd | | Empirical formula | Yield, percent |
|---|---|---|---|---|---|---|---|---|---|---|
| | Calc. | Found | Calc. | Found | Calc. | Found | Calc. | Found | | |
| I-1-22 | 46.90 | 47.74 | 4.39 | 4.85 | 6.83 | 7.12 | 26.16 | 25.31 | [Pd(OAc)$_2$]($\phi$ NH—)$_2$ | 85.6 |
| I-1-23 | 59.30 | 59.55 | 5.85 | 6.27 | 8.63 | 8.36 | 16.49 | 16.40 | [Pd(OAc)$_2$]($\phi$ CH$_2$NH—)$_4$ | 46.5 |
| I-1-26 | 43.80 | 43.54 | 4.20 | 4.14 | 7.30 | 7.29 | 27.94 | 28.26 | [Pd(OAc)$_2$](Py)$_2$ | 57.6 |

What is claimed is:

1. Solid, crystalline palladium diacetate.

2. The benzene adduct of palladium diacetate having the formula $[Pd(C_2H_3O_2)_2]_2(C_6H_6)$.

3. A process for preparing crystalline palladium diacetate which process comprises the steps of
   (a) rapidly treating an aqueous solution of a soluble palladium salt with an alkaline reagent at a temperature below about 85° C. to precipitate hydrous palladium oxide,
   (b) separating the precipitated hydrous palladium oxide and partially drying said precipitate to a palladium content between about 15 and about 70% Pd by weight,
   (c) treating said partially dried precipitate with glacial acetic acid medium at a temperature below about 85° C. to form palladium diacetate, and
   (d) separating palladium diacetate as a solid from said medium.

4. The process of claim 3 wherein the soluble palladium salt is $PdCl_2$ and the aqueous solution contains HCl in an amount sufficient to dissolve the palladium salt.

5. The process of claim 3 wherein the soluble salt is $Pd(NO_3)_2$ and the aqueous solution contains $HNO_3$ in an amount sufficient to dissolve the palladium salt.

6. The process of claim 3 wherein the soluble palladium salt is $Na_2PdCl_4$.

7. The process of claim 3 wherein the hydrous palladium oxide is precipitated in a period of time between about ¼ hour and about one hour.

8. The process of claim 3 wherein the hydrous palladium oxide precipitate contains from about 50–70% water.

9. As a new composition of matter, the adduct of palladium diacetate and a compound selected from the group consisting of pyridine, aniline, benzylamine, quinoline, 2-amino-pyrimidine and benzidine.

10. As a new composition of matter, the crystalline adduct of palladium diacetate and aniline having the empirical formula $[Pd(OAc)_2](C_6H_5NH-)_2$.

11. As a new composition of matter, the crystalline adduct of palladium diacetate and benzylamine having the empirical formula $[Pd(OAc)_2](C_6H_5CH_2NH-)_4$.

12. As a new composition of matter, the crystalline adduct of palladium diacetate and pyridine having the empirical formula $[Pd(OAc)_2](C_5H_5N-)_2$.

References Cited by the Examiner

UNITED STATES PATENTS 3,080,425  9/1964  Smidt et al. _____ 260—586

OTHER REFERENCES

Morehouse et al.: Chem. Ind. (London), 1964, pages 544–5. (Abstracted in Chemical Abstracts, vol. 60, Column 12, 880g.)

ALEX MAZEL, *Primary Examiner.*

DONALD G. DAUS, *Assistant Examiner.*